United States Patent [19]

Hopper

[11] 4,374,732
[45] Feb. 22, 1983

[54] RESINS FOR REMOVAL OF ORGANO-SULFUR COMPOUNDS FROM ORGANIC OR AQUEOUS MEDIA

[75] Inventor: Roger J. Hopper, Akron, Ohio

[73] Assignee: The Goodyear Tire & Rubber Company, Akron, Ohio

[21] Appl. No.: 307,348

[22] Filed: Sep. 30, 1981

Related U.S. Application Data

[63] Continuation-in-part of Ser. No. 198,022, Oct. 17, 1980, abandoned, which is a continuation of Ser. No. 61,577, Jul. 30, 1979, abandoned, which is a continuation-in-part of Ser. No. 918,243, Jun. 23, 1978, abandoned.

[51] Int. Cl.$^3$ .................... B01D 15/00; B01D 15/04
[52] U.S. Cl. .................... 210/690; 210/908; 525/355; 568/58; 568/59; 568/69
[58] Field of Search ............... 525/344, 355, 330, 333; 210/660, 690, 908, 909; 260/701

[56] References Cited

U.S. PATENT DOCUMENTS 2,944,033  7/1960  Goodman .................... 525/344

*Primary Examiner*—C. A. Henderson
*Attorney, Agent, or Firm*—J. Y. Clowney; A. T. Rockhill

[57] ABSTRACT

Organo-sulfur impurities are removed from organic or aqueous solutions by contacting said solutions with polymers containing functional groups consisting of metal salts of N-halosulfonamides.

1 Claim, No Drawings

RESINS FOR REMOVAL OF ORGANO-SULFUR COMPOUNDS FROM ORGANIC OR AQUEOUS MEDIA

This is a Continuation-in-part of patent application Ser. No. 198,022 filed Oct. 17, 1980, which was a continuation of patent application Ser. No. 61,577 filed on July 30, 1979, which in turn was a continuation-in-part of patent application Ser. No. 918,243 filed on June 23, 1978, all previous applications being now abandoned.

BACKGROUND OF THE INVENTION

Small amounts of organo-sulfur compounds in refinery or chemical plant streams are known to have a variety of undesirable effects. For example, they can poison catalysts, impart unpleasant odors and promote oxidation and gum formation in petroleum based fuels and lubricants. They can also form air polluting sulfur oxides on combustion. Volatile mercaptans, disulfides, and monosulfides are particularly difficult to separate by conventional distillation methods due to co-distillation and azeotrope formation. It is, therefore, desirable that a simple process be found to remove these volatile impurities from such chemical plant and refinery streams.

It has been found that volatile mercaptans, disulfides, and mono-sulfides can be readily removed from refinery and chemical plant streams by simply contacting such streams with certain reactive polymers.

SUMMARY OF THE INVENTION

A process of removing organo-sulfur impurities from a solution comprising, contacting said solution with a polymer which is a styrene/divinylbenzene copolymer containing 0.1 to 35 parts by weight of divinylbenzene per hundred parts by weight of the polymer, said polymer being characterized by containing at least one of the following pendant groups:

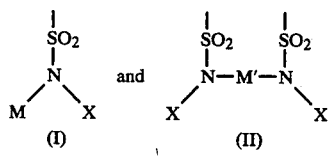

wherein X is selected from the group consisting of chlorine and bromine, M is selected from the group consisting of sodium and potassium and M' is selected from the group consisting of calcium and magnesium, and said organo-sulfur impurities being characterized by the structural formulae, $RS_{n'}R^1$ and $R^2SH$, wherein R, $R^1$ and $R^2$ are hydrocarbon radicals such as alkyl radicals having 1 to 20 carbon atoms, monounsaturated alkyl radicals having 3 to 20 carbon atoms diunsaturated alkyl radicals having 4 to 20 carbon atoms, aryl radicals having 6 to 20 carbon atoms, aralkyl radicals having 7 to 20 carbon atoms, cycloalkyl radicals having 5 to 12 carbon atoms and n' equals 1 or 2, and those having the structure

wherein $R^3$ is an alkylene radical of 3 to 6 carbon atoms, optionally branched with one or two alkyl groups of 1 to 6 carbon atoms, and wherein R, $R^1$, $R^2$, and $R^3$ may optionally contain chloro, bromo, fluoro, hydroxy, alkoxy, aryloxy, cyano, nitro, carboalkoxy, carboaryloxy, alkylsulfonyl and arylsulfonyl substituents located one or more carbon atoms from the carbon attached to sulfur.

The polymers of the present invention contain as pendant reactive groups either or both of the following structures

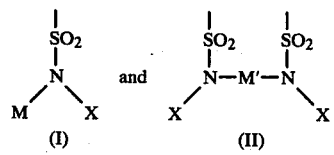

wherein X is chlorine or bromine, M is sodium or potassium and M' is calcium or magnesium. Structures I and II may optionally carry one or more molecules of water of hydration.

The attachment of such reactive groups to the polymer matrix may be depicted by the general structure

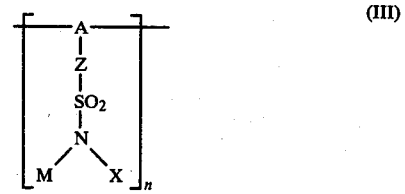

wherein A is a trivalent saturated hydrocarbon radical of 2 to 10 carbon atoms, 2 valences of which are part of the backbone chain while the third valency provides the point of attachment for Z, Z is a saturated aliphatic divalent hydrocarbon radical of 1 to 10 carbon atoms or an aromatic divalent hydrocarbon radical of 6 to 10 carbon atoms. It is to be understood that the structure of structural formula II would be attached to two different polymer chains or two sites on the same chain. The structure III depicted above implies a polymer wherein all the monomer units contain a N-halo-N-metallo sulfonamido moiety. It is not necessary for the practical application of the present invention that all the units contain such functional groups. Other monomer units which serve to form the backbone chain of the polymer, but which remain inert in the organo-sulfide removal process may also be present. It is desirable that a fraction (preferably 0.1 to 35 percent) of these units be crosslinked.

Since the efficiency of the polymers in removing organo-sulfur impurities is related to the concentration of reactive groups of structures I or II it is preferred that at least 5 percent of the monomer units contain these groups.

DESCRIPTION OF PREFERRED EMBODIMENTS

In a preferred embodiment the polymeric carrier is a styrene/divinylbenzene (DVB) copolymer, 0.1 to 35 percent of the monomer units thereof being the segmeric form of DVB. The matrix may be either microreticular or macroreticular. Such a polymer may be functionalized by the following sequence of reactions on the styrene units.

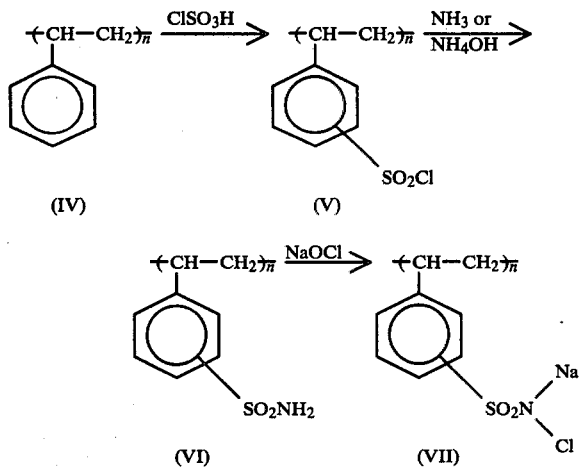

Structure VII illustrates a preferred reactive functionality wherein M is sodium and X is chlorine. Alternatively, the same sequence may be carried out on a sulfonated polystyrene, wherein the aromatic ring of the styrene monomer unit is already substituted with —SO$_3$H. Polymers analogous to Structure VII have been reported in the prior art as bactericides. Y. Nakamura, "*Journal of the Chemical Society of Japan, Industrial Chemistry Section,*" Volume 57, pages 818–819, 1954.

In practice not all the repeat units of the polymer need be converted to structure VII. For example, a functional polystyrene polymer may contain, in addition to structure VII, units such as

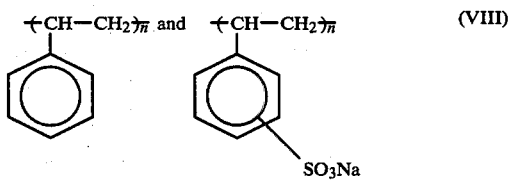

as well as water of hydration.

Illustrative of organo-sulfur impurities which can be removed according to the practice of the present invention are organic monosulfides, organic disulfides and mercaptans, having the following structural formulae: RS$_{n'}$R$^1$ and R$^2$SH wherein R, R$^1$ and R$^2$ are hydrocarbon radicals such as alkyl radicals having 1 to 20 carbon atoms, monounsaturated alkyl radicals having 3 to 20 carbon atoms diunsaturated alkyl radicals having 4 to 20 carbon atoms, aryl radicals having 6 to 20 carbon atoms, aralkyl radicals having 7 to 20 carbon atoms, cycloalkyl radicals having 5 to 12 carbon atoms and n' equals 1 or 2, and those having the structure

wherein R$^3$ is an alkylene radical of 3 to 6 carbon atoms, optionally branched with one or two alkyl groups of 1 to 6 carbon atoms. R, R$^1$, R$^2$, R$^3$ may optionally contain various substituents located one or more carbon atoms from the carbon attached to sulfur. Such substituents include chloro, bromo, fluoro, hydroxy, alkoxy, aryloxy, cyano, nitro, carboalkoxy, carboaryloxy, alkylfulfonyl and aryl sulfonyl, that is, substituents which are substantially unreactive toward the N-halo-N-metallosulfonamide moieties of the polymers of the present invention.

Representative, but not limiting, examples of organo-sulfur impurities which can be removed include the mercaptans, sulfides and disulfides with the alkyl groups methyl, ethyl, n-propyl, isopropyl, n-butyl, sec-butyl, tert-butyl, cyclohexyl, n-octyl and dodecyl. Additional impurities include phenyl sulfide, p-chlorophenyl disulfide, pentamethylene sulfide, thioanisole, allyl methyl sulfide, tetrahydrothiopene, cyclohexyl (2-cyanoethyl) sulfide, phenyl (2-bromoethyl) sulfide, dimethyl 3,3'-thiodipropionate, methyl-3-(methylthio) propionate and benzyl methyl sulfide.

Suitable fluid media from which dissolved organo-sulfur compounds may be removed by the practice of this invention include any medium which is unreactive toward the N-halo-N-metallo-sulfonamide groups on the polymers. Such media include, but are not limited to, saturated, unsaturated and aromatic hydrocarbons, ethers, esters, alcohols, sulfones, nitriles, aldehydes and ketones, preferably devoid of alpha-hydrogen, chlorinated and brominated hydrocarbons and water.

The preferred purification process constitutes contacting the fluid medium containing dissolved organo-sulfur impurities with the reactive N-halo-N-metallo-sulfonamido-containing polymer. To illustrate, but not to limit, such contact is carried out over a period of five minutes to 48 hours batchwise or continuously at a temperature from about 10° C. to 90° C. The amount of reactive polymer used per unit volume of fluid media is dependent on the reactive group content of the polymer, the concentration of organo-sulfur impurities in the medium, and the degree of purification desired. It is expected that those skilled in the art will be able to select conditions wherein most, or substantially all the organo-sulfur impurities are removed from the fluid medium.

It is believed that the organo-sulfur compounds become chemically bound to the polymers, via reactions of the type

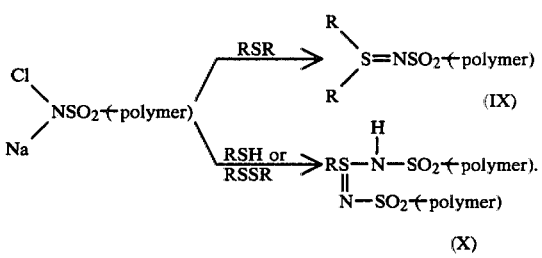

Such reactions, wherein the N-halo-N-metallo-sulfonamide group is bound to a monomeric radical are known in the prior art (F. G. Mann and W. J. Pope, Journal of the Chemical Society, 1922, p. 1052; S. G. Clark, J. Kenyon and J. Phillips, Journal of the Chemical Society, 1930, p. 1225; J. R. Alexander and H. McCombe, Journal of the Chemical Society, 1932, p. 2087; G. Balmer and F. G. Mann, Journal of the Chemical Society, 1932, p. 2087; G. Balmer and F. G. Mann, Journal of the Chemical Society, 1945, p. 666). The prior art also reveals for monomeric analogs of IX, hydrolysis and reduction reactions wherein the S=N bond is cleaved and a sulfoamide is formed (cf. T. F. Gilchrist and C. J. Moody, Chemical Reviews, Volume 77, p. 409 (1977). Such reactions suggest that the spent polymers could be regenerated, if desired, via the sequence:

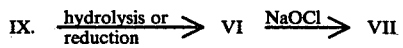

IX. $\xrightarrow{\text{hydrolysis or reduction}}$ VI $\xrightarrow{\text{NaOCl}}$ VII Preferably, these reactive polymers are insoluble in the fluid media to be purified. The fluid media to be purified may be organic or may be aqueous. Such insolubility may be achieved by use of polymers wherein about 0.1 to 35 percent of the monomer units are crosslinked. Preferably, the physical form of the insoluble polymer is that of small beads or particles with diameters from about 0.01 millimeter to about 15 millimeters, a diameter range of 0.1 to 5 millimeters being most preferred. After reaction with organo-sulfur impurities these polymers can be readily separated from the fluid media by standard filtration techniques. Alternatively, the media to be purified may be passed more or less continuously through a column or bed packed with the aforesaid insoluble, particulate polymers. The aforementioned methods of separation are not intended to be limiting.

The use of crosslinked polymers with inert backbone as carriers for reactive functional groups is known in the art. For example, see U.S. Pat. No. 4,029,706. The novelty of the present invention resides in the use made of the polymer. The practical use of these insoluble crosslinked polymers generally requires that the reactive functional groups be available for intimate contact with the reacting species. The following illustrates two ways of achieving such contact. Polymer beads of the microreticular or gel-type may be used wherein the matrix is lightly crosslinked (about 0.1 to 10 percent by weight of the monomer units, preferably 1.0 to 10 percent). These beads swell in appropriate solvents, allowing diffusion and subsequent reaction throughout their interior. A consequent restriction on their practical application is that the fluid medium must itself swell the beads or must contain an added solvent which does. Alternatively, the polymer beads may be of the macroreticular type, wherein the matrix is more heavily crosslinked (about 15 to 35 percent of the monomer units). Such polymers are substantially nonswellable, but very porous, having high internal surface area. Reactions of these polymers occur primarily on the surfaces and are thus more or less independent of the nature of the fluid medium. The use of microreticular and microreticular polymers containing reactive functional groups has been discussed in the prior art.

W. Heitz, "Advances in Polymer Science,", Volume 23, Page 1, Springler Verlag, New York, N.Y. 1977.

N. K. Mathur and R. E. Williams, "Journal of Macromolecular Science, Reviews in Macromolecular Chemistry," Volume G-15, Page 117, Marcel Dekker, New York, N.Y. 1976.

A. R. Pitochelli, "Ion Exchange Catalysis and Matrix Effects," Rohm & Haas Co., Philadelphia, Pa.

The functional polymers must not be reactive with the media in which the sulfur impurity is suspended or dissolved.

The following Examples are intended to illustrate, but not limit, the practice of the present invention. The preparation of a suitable polymer is described in Example 1. Examples 2 and 3 demonstrate the use of such polymers to remove organo-sulfur compounds from fluid media. Example 4 illustrates structure II and its use. Commercially available polymers used in the Examples were Amberlite TM XAD-4 (Rohm & Haas Co.) a 20-50 mesh macroreticular polystyrene crosslinked with divinylbenzene, and a 200-400 mesh microreticular polystyrene crosslinked with 2% divinylbenzene (Eastman Kodak Co., Catalog No. 11180).

EXAMPLE 1

Amberlite TM XAD-4 was washed with water, acetone, and diethylether, then dried under vacuum for 3 hours at 105° C. A 32 gram portion was mixed, under nitrogen, with 100 ml of chlorosulfonic acid, causing the temperature to rise to 48° C. The mixture was heated at 70° C. for 1 hour, 250 ml of carbon tetrachloride added, and heating continued for 1.5 hours at 70° C. The polymer was filtered under nitrogen and soaked successively in 300 ml carbon tetrachloride (1.5 hours), 250 ml diethylether (1 hour), and 250 ml diethylether (overnight). Next, the polymer was mixed with 250 ml of fresh diethylether and stirred for 6 hours while passing a slow stream of ammonia into the mixture. After standing overnight, the mixture was stirred for 5 hours with 100 ml. of conc. ammonium hydroxide. The polymer was filtered, washed with water, added to 600 ml of water containing a few drops of bromophenol blue indicator, and heated for 2 hours on a steam bath. During the heating, just enough conc. hydrochloric acid was periodically added to keep the aqueous phase acidic to the indicator endpoint. The polymer was then washed overnight in flowing water, filtered, and dried to constant weight at 70° C. Elemental analysis gave 3.96% nitrogen and 12.46% sulfur. Infrared spectroscopic analysis indicated the presence of $-SO_2NH_2$ groups, $-SO_3H$ groups, and water of hydration.

A 25 gram portion of the above polymer was stirred with 71 ml of 2.5 Molar sodium hypochlorite and 5.7 grams of sodium hydroxide, causing the temperature to rise from ambient to 53° C. After 1.5 hours, the polymer was washed with water, heated 2.5 hours at 30°-35° C. with a second 71 ml portion of the sodium hypochlorite, washed 2.5 hours under flowing water, and dried overnight at 40° C. to yield 21.1 grams of product. Iodometric analysis showed the presence of 1.1 milliequivalents of active chlorine per gram of polymer. To assay the activity of the polymer toward sulfide removal, 1.00 grams was mixed with a solution of normal-, secondary-, and tertiary-butyl sulfide, 0.083 grams each, in 50 ml of normal pentane. A gas chromatographic internal standard procedure was used to analyze the pentane solution after 24 and 28 hour agitation at ambient temperature. In both instances the results showed decreases of 57%, 40% and 49% for normal-, secondary-, and tertiary-butylsulfide, respectively, corresponding to a sulfide removal capacity of 0.83 millimoles per gram of polymer. Control experiments demonstrated that the sulfide removal capacities of Amberlite TM XAD-4 and the intermediate modified polymer (prior to reaction with sodium hypochlorite) were less than 0.02 millimoles per gram.

EXAMPLE 2

The final polymer from Example 1, 3.01 grams, was added to a solution of 0.167 grams normal butyl sulfide in 50 ml of normal pentane and agitated at ambient temperature in a closed vial. Gas chromatographic analysis of the pentane showed 93% of the sulfide removed after 1.5 hours and 100% after 24 hours.

EXAMPLE 3

Microreticular polystyrene beads (Eastman Catalog No. 11180) were modified by procedures similar to those described in Example 1. Iodometric analysis showed 2.7 millimoles active chlorine per gram of polymer. Sulfide removal capacity as determined by reaction of 0.490 grams polymer (swollen with 1.2 ml of methanol) with 0.200 grams isopropylsulfide in 25 ml normal pentane was 2.6 millimole per gram of polymer.

A solution of 0.059 grams (0.44 millimole) of methyl-3-methylthio-propionate in 7.0 ml of water is agitated overnight at ambient temperature with 0.107 grams of the polymer beads. The treatment removes 0.27 millimole of the methyl-3-methylthio-propionate from the aqueous phase, corresponding to a sulfide removal capacity of 2.7 millimole per gram of polymer. When the process is repeated using 0.201 grams of the polymer beads, the aqueous phase is essentially devoid of methyl-3-methylthio-propionate.

EXAMPLE 4

The starting polymer was that of Example 1 at the intermediate stage prior to reaction with sodium hypochlorite. A 5.0 grams portion of this polymer was mixed with a suspension of 0.5 grams of calcium hydroxide in 30 ml of distilled water and allowed to stand 20 minutes with occasional swirling. The polymer was then washed with distilled water to remove the finely divided calcium hydroxide particles. To the wet polymer beads was added 11.0 ml of 0.25 molar calcium hypochlorite solution, and the mixture allowed to stand one hour ten minutes with occasional stirring. The polymer was filtered off and soaked in about 50 ml of distilled water causing the water to become alkaline. The water was periodically replaced with fresh distilled water until it remained neutral on extended contact with the polymer. After drying at 40° C. overnight, 5.5 grams of product were obtained. Iodometric analysis showed 0.54 milliequivalents of active chlorine per gram of polymer.

Shaking 1.0 gram of the polymer with 0.0708 gram of isopropyl sulfide in 18.6 ml of pentane removed 40 weight percent of the sulfide. Similarly, 1.5 gram of polymer with 0.033 gram isopropyl sulfide in 19 ml pentane removed 93 weight percent of the sulfide.

While certain representative embodiments and details have been shown for the purpose of illustrating the invention, it will be apparent to those skilled in this art that various changes and modifications may be made therein without departing from the scope of the invention.

I claim:

1. A process of removing organo-sulfur impurities from a solution comprising, contacting said solution with a polymer which is a styrene/divinylbenzene copolymer containing 0.1 to 35 parts by weight of divinylbenzene per hundred parts by weight of the polymer, said polymer being characterized by containing at least one of the following pendant groups:

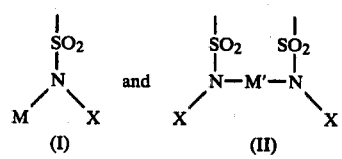

wherein X is selected from the group consisting of chlorine and bromine, M is selected from the group consisting of sodium and potassium and M' is selected from the group consisting of calcium and magnesium wherein said polymer contains at least one mole of said pendant groups for every mole of said organo-sulfur impurities that are to be removed, and said organo-sulfur impurities being characterized by the structural formulae, $RS_{n'}R^1$ and $R^2SH$, wherein R, $R^1$ and $R^2$ are hydrocarbon radicals such as alkyl radicals having 1 to 20 carbon atoms, monounsaturated alkyl radicals having 3 to 20 carbon atoms diunsaturated alkyl radicals having 4 to 20 carbon atoms, aryl radicals having 6 to 20 carbon atoms, aralkyl radicals having 7 to 20 carbon atoms, cycloalkyl radicals having 5 to 12 carbon atoms and n' equals 1 to 2, and those having the structure

wherein $R^3$ is an alkylene radical of 3 to 6 carbon atoms, optionally branched with one or two alkyl groups of 1 to 6 carbon atoms, and wherein R, $R^1$, $R^2$, and $R^3$ may optionally contain chloro, bromo, fluoro, hydroxy, alkoxy, aryloxy, cyano, nitro, carboalkoxy, carboaryloxy, alkylsulfonyl and arylsulfonyl substituents located one or more carbon atoms from the carbon attached to sulfur.

* * * * *